United States Patent [19]

Mangone, Jr.

[11] Patent Number: 5,419,519

[45] Date of Patent: May 30, 1995

[54] CABLE RADIUS PROTECTOR

[76] Inventor: Peter G. Mangone, Jr., 28600 Buchanan Dr., Evergreen, Colo. 80439

[21] Appl. No.: 214,774

[22] Filed: Mar. 16, 1994

[51] Int. Cl.⁶ .............................................. F16L 3/00
[52] U.S. Cl. .......................................... 248/49; 248/65
[58] Field of Search ................ 248/49, 57, 56, 65, 248/73, 224.3

[56] References Cited

U.S. PATENT DOCUMENTS 851,375  4/1907  Raymond ............................ 248/49
2,372,674 4/1945  Jordan ................................ 248/65

Primary Examiner—Alvin C. Chin-Shue
Assistant Examiner—Anita M. King
Attorney, Agent, or Firm—Klaas, Law, O'Meara & Malkin

[57] ABSTRACT

A device for guiding a cable around a corner formed at the intersection of two angularly related walls so as to avoid damage to the cable wherein the device has first surfaces for overlying the walls and opposite generally planar second surfaces and wherein a guiding surface projects outwardly from each of the second surfaces and wherein the first guiding surface turns the cable ninety degrees from a first direction to a second direction and holds the cable against the second surface and the second guiding surface turns the cable ninety degrees from the second direction to a third direction and holds the cable against the second surface and wherein the first direction lies generally in a plane parallel to one of the second surfaces and the third direction lies generally in a plane parallel to the other of the second surfaces and the second direction is superposed over the intersection of the second surfaces and spaced equidistantly from each of the planes of the planar surfaces thereof.

22 Claims, 1 Drawing Sheet

CABLE RADIUS PROTECTOR

FIELD OF THE INVENTION

This invention relates generally to the installation of television cable and more particularly to the protection of a television cable from damage to its ability to adequately carry and deliver electronic signals when it must turn a corner formed at the intersection of two angularly related walls.

BACKGROUND OF THE INVENTION

Many different kinds of problems are encountered during the installation of cable, such as coaxial and/or fiber optic cable. Many broadband transmission cables, such as coaxial or fiber optic, come with directions that they are not to be bent or turned more severely than the arc of a circle having, for example, a radius less than two and one-half inches. This presents a problem when it is necessary to turn a coaxial or fiber optic cable around a corner formed at the intersection of two angularly related walls. The practices now employed in installing coaxial cable in those situations result in a violation of the minimum turning radius and diminutions in the performance characteristics of the cable.

Brief Description of the Invention

This invention provides a device for guiding a cable, such as a television cable, around a corner formed at the intersection of two angularly related walls which device insures that a minimum turning radius will not be violated.

In a preferred embodiment of the invention, the device for guiding a cable around a corner formed at the intersection of two angularly related walls comprises a member having a first portion having a first surface for overlying a portion of one of the angularly related walls adjacent to the corner and a second portion having a first surface for overlying a portion of the other of the two angularly related walls adjacent to the corner. The first portion has a generally planar second surface facing in a direction opposite to its first surface. First guide means project outwardly from the second surface for guiding the cable and have at least an arcuate portion. The second portion has a generally planar second surface facing in a direction opposite to its first surface. Second guide means project outwardly from the second surface of the second guide means for guiding the cable and have at least an arcuate surface. The first guide means turn the cable ninety degrees from a first direction to a second direction and the second guide means turn said cable ninety degrees from the second direction to a third direction. The first direction lies generally in a plane parallel to the second surface of the first portion and the third direction lies generally in a plane parallel to the second surface of the second portion. The second direction is superposed over the intersection of the generally planar second surfaces of the first and second portions.

A linear entrance portion is integral with the at least an arcuate portion of the first guide means and a linear exit portion is integral with the at least an arcuate portion of the second guide means. A linear exit portion is integral with the at least an arcuate portion of the first guide means and a linear entrance portion is integral with the at least an arcuate portion of the second guide means. The linear exit portion of the first guide means is parallel and opposite to the linear entrance portion of the second guide means. The centerline between the linear exit portion of the first guide means and the linear entrance portion of the second guide means is located to be superposed over a portion of the intersection of the second surfaces of the first and second portions and is spaced equidistantly from each of the planes of the generally planar second surfaces.

The second surface of each of the first and second portions is generally planar. The at least an arcuate portion of the first guide means has an outer surface located to be contacted by the cable. The outer surface of the at least an arcuate portion of the first guide means has an angular relationship with the second surface of the first portion that decreases from a beginning portion thereof toward an ending portion thereof. The entrance portion and the at least an arcuate portion of the second guide means have an outer surface located to be contacted by the cable. The outer surface of the at least an arcuate portion of the second guide means has an angular relationship with the second surface of the second portion that increases from a beginning portion thereof to an ending portion thereof. These angular relationships function to hold the cable in place against the second surfaces. In the preferred embodiment, the decreasing angular relationship is from about ninety degrees to about forty-five degrees and the increasing angular relationship is from about forty-five degrees to about ninety degrees.

BRIEF DESCRIPTION OF THE DRAWINGS

An illustrative and presently preferred embodiment of the invention is illustrated in the accompanying drawing in which.

DETAILED DESCRIPTION OF THE INVENTION

Figure 1:
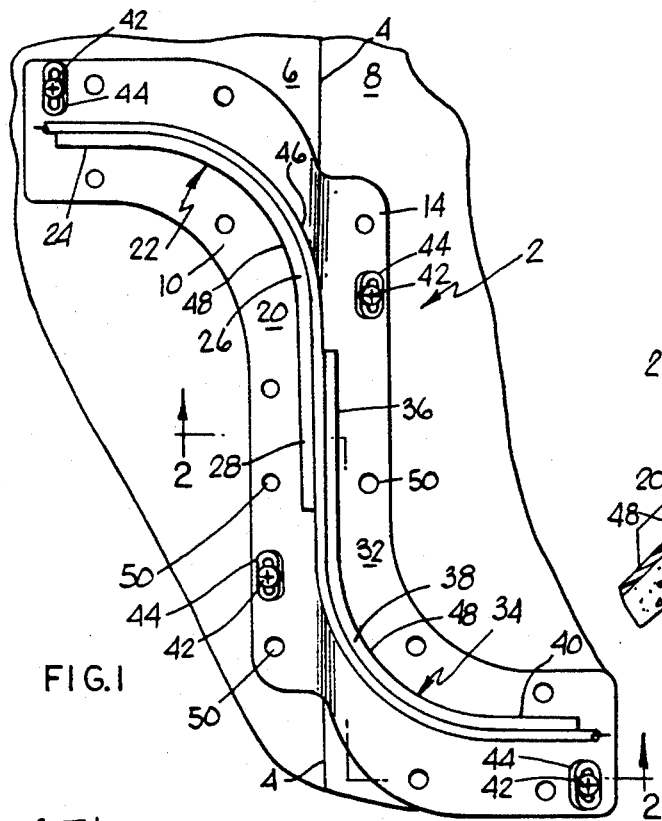
FIG. 1 is a front elevational view of the invention in place against adjoining walls of a building.
Figure 2:
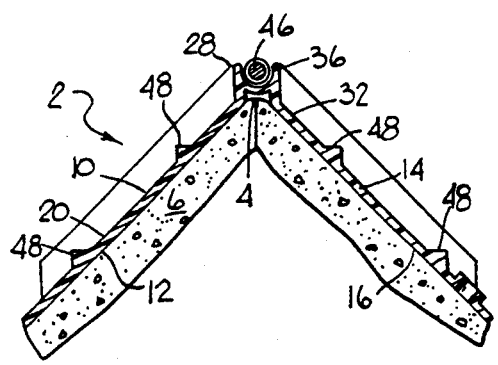
FIG. 2 is a cross-sectional view taken on the line 2—2 of FIG. 1.
Figure 3:
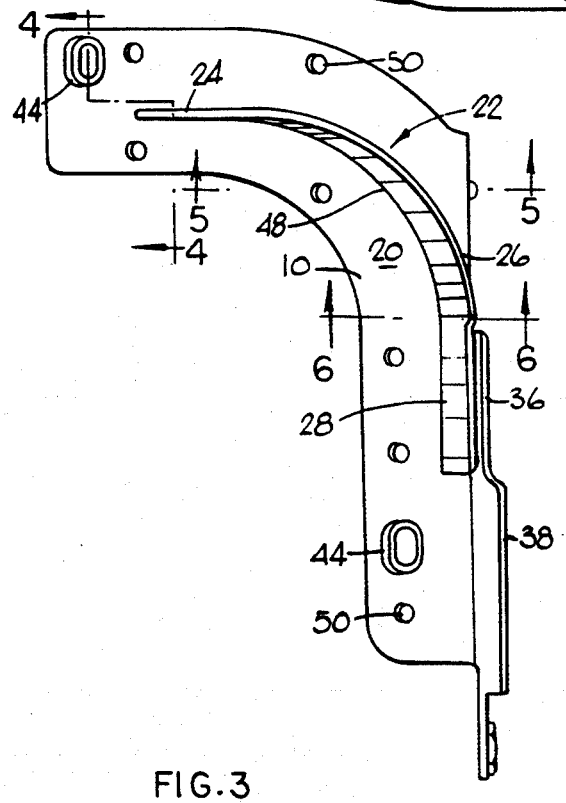
FIG. 3 is a side elevational view of the invention.

In FIGS. 1 and 2, there is illustrated a device 2 of this invention in place against the corner 4 formed at the intersection of two angularly related walls 6 and 8. The device or member 2 has a first portion 10 having a first surface 12 for contacting a portion of the wall 6 adjacent to the corner 4 and a second portion 14 having a first surface 16 for contacting a portion of the wall 8 adjacent to the corner 4. In some instances it may be necessary to provide a shim between either the first surface 12 or 16 and the wall 6 or 8 to preserve the angular relationship of the first surfaces 12 and 16. As illustrated in FIGS. 1 and 2, the device 2 is designed for use where the walls 6 and 8 form an outside corner 4. It is understood that the device 2 can be designed for use with an inside corner. Also, the device 2 is illustrated for use wherein the walls 6 and 8 intersect at an angle of ninety degrees. It is further understood that the device 2 can be designed for use wherein the walls 6 and 8 intersect at angles greater or lesser than ninety degrees.

Figure 4:
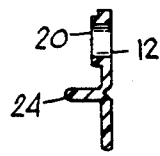
FIG. 4 is a cross-sectional view taken on the line 4—4 of FIG. 3.
Figure 5:
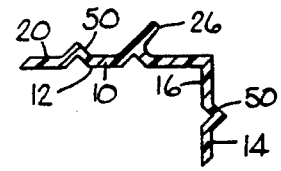
FIG. 5 is a cross-sectional view taken on the line 5—5 of FIG. 3.
Figure 6:
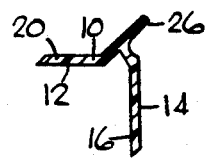
FIG. 6 is a cross-sectional view taken on the line 6—6 of FIG. 3.

The first portion 10 has a generally planar second surface 20 facing in a direction opposite to the first surface 12. First guide means 22 project outwardly from the generally planar second surface 20. The first guide means 22 have a linearly extending entrance portion 24, an integral arcuate portion 26 and a linearly extending exit portion 28. As illustrated in FIGS. 4–6, the entrance portion 24 extends at an angle of about ninety degrees with the generally planar second surface 20 and the arcuate portion 26 has an angular relationship with the generally planar second surface 20 that decreases from an angle of about ninety degrees to an angle of about forty-five degrees and the exit portion 28 extends at an angle of about forty-five degrees with the generally planar second surface 20. It is understood that the angle of forty-five degrees is preferred but it can be greater or less. The primary purpose of this angular relationship is to insure that the cable is held in contact with the generally planar second surface 20.

The second portion 14 has a generally planar second surface 32 facing in a direction opposite to the first surface 16. Second guide means 34 project outwardly from the generally planar second surface 32. The second guide means 34 have a linearly extending entrance portion 36 that is parallel to and spaced from the linearly extending exit portion 28, an integral arcuate portion 38 and a linearly extending exit portion 40. The entrance portion 36 extends at an angle of about forty-five degrees with the generally planar second surface 32, the arcuate portion 38 has an angular relationship with the second surface 32 that increases from an angle of about forty-five degrees to an angle of about ninety degrees and the exit portion 40 extends at an angle of about ninety degrees with the second surface 32. Instead of the relationship illustrated in FIGS. 4–6, the guide means could have a first portion extending vertically from the surface 20 or 32 and an integral flange portion which could be linearly or arcuately shaped.

As illustrated in FIG. 1, the device 2 is secured to the walls 6 and 8 using headed screws 42 passing through reinforced openings 44. A cable 46, coaxial, fiber optic or other similar types, is positioned on the device 2 so that it is in contact with the arcuate portions 26 and 38. The radius of curvature of the base 48 of the arcuate sections 26 and 38 depends on the size of the cable and the desired radius of curvature. If the desired radius of curvature is 2.5 inches and the cable has a diameter of 0.312 inch, each base 48 has a radius of curvature of about 2.25 inches so that the centerline of the television cable 46 when in contact with the arcuate surfaces 26 and 38 has a radius of curvature of about 2.50 inches. As illustrated in FIG. 1, the first guide means 26 turn the television cable through ninety degrees in a plane substantially parallel to the plane of the generally planar second surface 20 so that the portion of the television cable between the exit portion 28 and the entrance portion 36 is directly superposed over the intersection of the generally planar second surface 20 and the generally planar second surface 32 and is spaced equidistantly from each of the planes of the generally planar second surfaces 20 and 32. The second guide means 38 turn the television cable through ninety degrees in a plan substantially parallel to the plane of the generally planar second surface 32. The device 2 is formed from a plastic material such as high density polyethylene or other materials having similar characteristics and has a plurality of outwardly projecting pads 50 which are contacted by ejector pins (not shown) to remove the device 2 from the mold.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A device for guiding a cable around a corner formed at the intersection of two angularly related walls comprising:
   a first portion having a first surface for overlying a portion of one of said angularly related walls adjacent to said corner and a second portion having a first surface for overlying a portion of the other of said angularly related walls adjacent to said corner;
   mounting means for mounting said device on said angularly related walls;
   said first portion having a second surface facing in a direction opposite to its first surface;
   first guide means projecting outwardly from said second surface for guiding said cable;
   said first guide means having at least an arcuate portion;
   said second portion having a second surface facing in a direction opposite to its first surface;
   second guide means projecting outwardly from said second surface of said second portion for guiding said cable;
   said second guide means having at least an arcuate portion; and
   said first guide means turning said cable ninety degrees from a first direction to a second direction and said second guide means turning said cable ninety degrees from said second direction to a third direction.

2. A device as in claim 1 wherein:
   the angular relationship of said first surfaces of said first and second portions is ninety degrees.

3. A device as in claim 1 wherein:
   said second surfaces are generally planar;
   said first direction lies generally in a plane parallel to said second surface of said first portion and said third direction lies generally in a plane parallel to said second surface of said second portion.

4. A device as in claim 3 and further comprising:
   a linear exit portion integral with said at least an arcuate portion of said first guide means; and
   a linear entrance portion integral with said at least an arcuate portion of said second guide means.

5. A device as in claim 4 wherein:
   said linear exit portion of said first guide means is parallel and opposite to said linear entrance portion of said second guide means.

6. A device as in claim 5 wherein:
   the centerline between said linear exit portion of said first guide means and said linear entrance portion of said second guide means is located to be superposed over a portion of the intersection of said second surfaces of said first and second portions.

7. A device as in claim 6 wherein:
   said centerline between said linear exit portion of said first guide means and said linear entrance portion of said second guide means is spaced equidistantly from each of the planes of the generally planar second surfaces of said first and second portions.

8. A device as in claim 1 wherein:

said second surface of each of said first and second portions being generally planar;

said at least an arcuate portion of said first guide means having an outer surface located to be contacted by said cable;

said outer surface of said at least an arcuate portion of said first guide means having an angular relationship with said second surface of said first portion that decreases from a beginning portion thereof toward an ending portion thereof;

said at least an arcuate portion of said second guide means having an outer surface located to be contacted by said cable; and said outer surface of said at least an arcuate portion of said second guide means having an angular relationship with said second surface of said second portion that increases from a beginning portion thereof to an ending portion thereof.

9. A device as in claim 1 and further comprising:

holding means applying a force on said cable to hold said cable against said second surfaces.

10. A device as in claim 9 and further comprising:

a linear entrance portion integral with said at least an arcuate portion of said first guide means; and a linear exit portion integral with said at least an arcuate portion of said second guide means.

11. A device as in claim 9 and further comprising:

a linear exit portion integral with said at least an arcuate portion of said first guide means; and a linear entrance portion integral with said at least an arcuate portion of said second guide means.

12. A device as in claim 11 wherein:

said linear exit portion of said first guide means is parallel and opposite to said linear entrance portion of said second guide means.

13. A device as in claim 12 wherein:

said second surfaces are generally planar;

the centerline between said linear exit portion of said first guide means and said linear entrance portion of said second guide means is located to be superposed over a portion of the intersection of said second surfaces of said first and second portions.

14. A device as in claim 13 wherein:

said centerline between said linear exit portion of said first guide means and said linear entrance portion of said second guide means is spaced equidistantly from each of the planes of the generally planar second surfaces of said first and second portions.

15. A device as in claim 9 wherein said holding means comprise:

portions of said first and second guide means overlying portions of said cable.

16. A device as in claim 15 wherein said portions of said first and second guide means comprise:

said at least an arcuate portion of said first guide means having an outer surface located to be contacted by said cable;

said outer surface of said at least an arcuate portion of said first guide means having an angular relationship with said second surface of said first portion that decreases from a beginning portion thereof toward an ending portion thereof;

said at least an arcuate portion of said second guide means having an outer surface located to be contacted by said cable; and said outer surface of said at least an arcuate portion of said second guide means having an angular relationship with said second surface of said second portion that increases from a beginning portion thereof to an ending portion thereof.

17. A device as in claim 16 wherein:

said decreasing angular relationship is from about ninety degrees to about forty-five degrees; and said increasing angular relationship is from about forty-five degrees to about ninety degrees.

18. A device as in claim 16 and further comprising:

a linear entrance portion integral with said at least an arcuate portion of said first guide means; and a linear exit portion integral with said at least an arcuate portion of said second guide means.

19. A device as in claim 16 and further comprising:

a linear exit portion integral with said at least an arcuate portion of said first guide means; and a linear entrance portion integral with said at least an arcuate portion of said second guide means.

20. A device as in claim 19 wherein:

said linear exit portion of said first guide means is parallel and opposite to said linear entrance portion of said second guide means.

21. A device as in claim 20 wherein:

said second surfaces are generally planar;

the centerline between said linear exit portion of said first guide means and said linear entrance portion of said second guide means is located to be superposed over a portion of the intersection of said second surfaces of said first and second portions.

22. A device as in claim 21 wherein:

said centerline between said linear exit portion of said first guide means and said linear entrance portion of said second guide means is spaced equidistantly from each of the planes of the generally planar second surfaces of said first and second portions.

* * * * *